US007370350B1

(12) United States Patent
Salowey

(10) Patent No.: US 7,370,350 B1
(45) Date of Patent: May 6, 2008

(54) METHOD AND APPARATUS FOR RE-AUTHENTICATING COMPUTING DEVICES

(75) Inventor: Joseph Salowey, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 704 days.

(21) Appl. No.: 10/185,503

(22) Filed: Jun. 27, 2002

(51) Int. Cl.
*H04L 9/00* (2006.01)
*H04K 1/00* (2006.01)
*G06F 21/20* (2006.01)

(52) U.S. Cl. .................... 726/7; 726/14; 713/168; 713/182; 380/259

(58) Field of Classification Search ............... 726/4–6; 713/168–169
See application file for complete search history.

(56) References Cited

U.S. PATENT DOCUMENTS

| 6,032,260 | A * | 2/2000 | Sasmazel et al. ............ 726/10 |
| 6,067,621 | A * | 5/2000 | Yu et al. .................... 713/172 |
| 6,189,098 | B1 * | 2/2001 | Kaliski, Jr. ................ 713/168 |
| 6,856,800 | B1 * | 2/2005 | Henry et al. ................ 455/411 |
| 6,879,690 | B2 * | 4/2005 | Faccin et al. ............... 380/247 |
| 6,895,502 | B1 * | 5/2005 | Fraser ....................... 713/168 |
| 2002/0012433 | A1 * | 1/2002 | Haverinen et al. .......... 380/247 |
| 2002/0077078 | A1 * | 6/2002 | Antti ......................... 455/410 |
| 2003/0120763 | A1 * | 6/2003 | Volpano .................... 709/223 |
| 2003/0188195 | A1 * | 10/2003 | Abdo et al. ................ 713/201 |
| 2003/0226017 | A1 * | 12/2003 | Palekar et al. ............. 713/168 |
| 2005/0152305 | A1 * | 7/2005 | Ji et al. ..................... 370/328 |
| 2005/0232428 | A1 * | 10/2005 | Little et al. ................. 380/277 |
| 2005/0246531 | A1 * | 11/2005 | Fabre ......................... 713/168 |
| 2005/0251680 | A1 * | 11/2005 | Brown et al. ............... 713/171 |
| 2006/0133613 | A1 * | 6/2006 | Ando et al. ................ 380/270 |
| 2006/0215601 | A1 * | 9/2006 | Vleugels et al. ............ 370/328 |
| 2006/0240802 | A1 * | 10/2006 | Venkitaraman et al. ..... 455/411 |
| 2007/0162751 | A1 * | 7/2007 | Braskich et al. ............ 713/169 |

OTHER PUBLICATIONS

B. Aboba, D. Simon. "RFC 2716—PPP EAP TLS Authentication Protocol" Oct. 1999.*
M. Burrows, M. Abadi, R. Needham "A Logic of Authentication" (Feb. 1990) ACM Transactions on Computer Systems (TOCS) vol. 8 Issue 1 pp. 18-36.*
B.C. Neuman, T. Ts'o. "Kerberos: An Authentication Service for Computer Networks" (Sep. 1994) IEEE Communications Magazine, vol. 32, No. 9, pp. 33-38.*

(Continued)

*Primary Examiner*—Christopher Revak
(74) *Attorney, Agent, or Firm*—Hickman Palermo Truong & Becker LLP

(57) ABSTRACT

A method of authenticating a first computing device in communication over a network to a second computing device is disclosed. The first computing device is authenticated to the second computing device using a first authentication mechanism. The first authentication mechanism is based on Extensible Authentication Protocol (EAP) or IEEE 802.1x authentication. Short-term re-authentication data is generated and issued to the first computing device. Later, a request from the first computing device to re-authenticate to the second computing device is received. The first computing device is re-authenticated to the second computing device using a challenge-response mechanism in which the first computing device authenticates itself by presenting the short-term authentication credential to the second computing device. Accordingly, re-authentication proceeds more quickly and with fewer message exchanges.

39 Claims, 5 Drawing Sheets

OTHER PUBLICATIONS

H. Haverinen. "EAP SIM Authentication draft-haverinen-pppext-eap-sim-03.txt" (Feb. 2002).*

R. Cosmin "SSL, Kerberos, and the Leighton-Micali Protocol" (Oct. 1993) ACM SIGOPS Operating System Review vol. 27 Issue 4. pp. 24-30.*

M. Swift, J. Brezak "The Windows 2000 RC4-HMAC Kerberos Encryption Type" (Oct. 1999) CAT Working Group.*

Lowe, Gavin. "An Attack on the Needham-Schroeder Public-Key Authentication Protocol" (Aug. 22, 1995) Information Processing Letters.*

Syverson, P. 1993. On key distribution protocols for repeated authentication. SIGOPS Oper. Syst. Rev. 27, 4 (Oct. 1993), 24-30. DOI=http://doi.acm.org/10.1145/163640.163642.*

Freier et a;, "The SSL Protocol: Version 3.0", Nov. 18, 1996, Transport Layer Security Working Group Internet Draft, p. 1-62.*

H. Haverinen, "EAP SIM Authentication," Point-to-Point Extensions Working Group, Feb. 2002, pp. 1-26.

H. Haverinen, "EAP SIM Authentication, draft-haverinen-pppext-eap-sim-04.txt," Point-to-Point Extensions Working Group, Jun. 2002, pp. 1-26.

Karl Fox, "2.3.9 Point-to-Point Protocol Extensions (pppext)," IETF Mar. 2001 Proceedings, http://www.ietf.org/proceedings/01mar/ietf50-57.htm, printed Nov. 14, 2002, pp. 1-5.

A. Medvinsky, et al., "Public Key Utilizing Tickets for Application Servers (PKTAPP)," Internet-Draft, Common Authentication Technology Working Group, Mar. 1998, pp. 1-6.

H. Anderson, et al., Protected EAP Protocol (PEAP), PPPEXT Working Group, Internet-Draft, Category: Standards Track, Feb. 23, 2002, pp. 1-42.

J. Kohl, et al., "The Kerberos Network Authentication Service (V5)" Network Working Group, Request for Comments: 1510, Sep. 1993, pp. 1-111.

* cited by examiner

METHOD AND APPARATUS FOR RE-AUTHENTICATING COMPUTING DEVICES

FIELD OF THE INVENTION

The present invention generally relates to authenticating computing devices that communicate over a network, including wireless and landline networks. The invention relates more specifically to a method and apparatus for re-authenticating computing devices using short-term re-authentication data.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computing devices that access resources over a network are commonly subjected to an authentication process. The authentication process determines whether a device requesting access to the network, or to a particular resource, actually is the device that it purports to be. If the device is authenticated, then depending on its identity, role, and other policy data, the device may be permitted to access the network, or selected resources within the network. In the past, authentication processes have focused on user authentication. More recently, technical development has migrated toward techniques for device authentication. These techniques are used, for example, for wireless computing devices such as cellular radiotelephones, personal digital assistants, and portable computers that communicate with servers and other resources over a network.

In one past approach, used in wireless networks, a particular authentication mechanism that is based on Extensible Authentication Protocol ("EAP"), known as EAP-SIM authentication, uses the GSM mobile phone infrastructure to authenticate users. In this approach, a GSM authentication center holds authoritative data that is used to authenticate the identity of particular mobile devices. Performing authentication involves communicating numerous messages between the mobile device and the GSM authentication center. If the mobile device requires re-authentication, the same process with multiple round-trip messages is used. This is time-consuming and computationally expensive. As a result, this approach is undesirable for mobile devices that frequently cross boundaries of wireless networks.

This approach is particularly unworkable because re-authentication can be triggered by numerous events. For example, re-authentication is typically required whenever the mobile device is powered up or rebooted, when a user logs off the device, when the device is moved to a new access point, when the device moves in and out of range of an access point, or when new cryptographic keys are distributed. In addition, it is possible for partial or unintended authentication to take place if the mobile device is temporarily or transiently brought in or out of range of an access point.

Based on the foregoing, there is a clear need for an improved method for re-authenticating mobile devices in networks.

There is a specific need for an improved method for efficiently re-authenticating mobile devices that use wireless networks.

There is also a need for an approach for efficiently re-authenticating mobile devices that use wireless networks that eliminates performing unnecessary round-trip messages and EAP-SIM authentication whenever re-authentication is needed. There is also a need for an approach that can reduce processing and network load on the GSM authentication infrastructure.

SUMMARY OF THE INVENTION

The foregoing needs, and other needs and objects that will become apparent for the following description, are achieved in the present invention, which comprises, in one aspect, a method of authenticating a first computing device in communication over a network to a second computing device using an EAP or 802.1x authentication mechanism. The first computing device is authenticated to the second computing device using a first authentication mechanism. Short-term re-authentication data is generated and issued to the first computing device. A request from the first computing device to re-authenticate to the second computing device is received. The first computing device is re-authenticated to the second computing device using a challenge-response mechanism in which the first computing device authenticates itself by presenting the short-term authentication credential to the second computing device. Accordingly, re-authentication proceeds more quickly and with fewer message exchanges.

According to one feature, the first authentication mechanism is EAP-SIM.

According to another feature, the short-term authentication data comprises a temporary authentication key and a credential, and the temporary authentication key is encrypted using a shared secret known only to the first computing device and second computing device. The shared secret is established during a previous authentication step. In a related feature, the short-term authentication data comprises a credential that contains the temporary authentication key, a user identity value and a key validity date value, and the short-term authentication data is encrypted using a secret key.

In yet another feature, the short-term authentication data comprises a temporary authentication key encapsulated in a credential, the credential comprises a user identity value, a key validity date value, an authentication type value that identifies a type of authentication process for use in authenticating the first computing device, and authorization data for use in authorizing the first computing device, and the short-term authentication data is encrypted using a secret key.

In still another feature, the short-term authentication data comprises a temporary authentication key and a credential, the temporary authentication key is encrypted such that only the first computing device and second computing device can decrypt the temporary authentication key, the first computing device and the second computing device communicate according to IEEE standard 802.1x, and the temporary authentication key is communicated from the second computing device to the first computing device in an 802.1x EAPOL(W)-KEY message.

In still another feature, the short-term authentication data comprises a temporary authentication key and a credential, the temporary authentication key is encrypted such that only the first computing device and second computing device can decrypt the temporary authentication key, the first computing device and the second computing device communicate according to IEEE standard 802.1x, and the temporary authentication key is communicated from the second computing device to the first computing device in an 802.1x EAP transaction designed distribute credentials according to this invention (EAP-FREAKY).

In yet another feature, a mapping is stored at the second computing device. The mapping associates information identifying the first computing device to the temporary authentication key. Still another feature is that generating and issuing the temporary authentication key further comprises generating and issuing a session key to the first computing device. A related feature is that the temporary authentication key is encrypted using a key that was generated during initial authentication. Further, during the challenge response authentication, a session key may be derived for purposes such as encrypting and authenticating session data.

Re-authenticating the first computing device to the second computing device using a challenge-response mechanism may comprise generating and sending a first random nonce from the second computing device to the first computing device; receiving, from the first computing device, a first hashed message authentication version of the first random nonce that is generated based on the temporary authentication key, the credential, and a second random nonce; generating and sending, to the first computing device, a second hashed message authentication version of the second random nonce based on the temporary authentication key; and receiving a message indicating success or failure of the re-authentication. In a related feature, the first hashed message authentication version of the first random nonce and the second hashed message authentication version of the second random nonce are generated based on a re-authentication key that is derived from the temporary authentication key.

The step of generating and issuing the temporary authentication key may further comprise the step of generating and issuing a first session key to the first computing device. The step of generating and sending a second hashed message authentication version of the second random nonce may further comprise generating and sending, to the first computing device, a second hashed message authentication version of the second random nonce based on the temporary authentication key, a new session key and a confounder value that are encrypted using the first session key. Alternatively, the new session key may be derived rather than sent.

In other aspects, the invention encompasses a computer apparatus, and a computer readable storage medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for re-authenticating computing devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| 1.0 | Structural & Functional Overview |
| 2.0 | Re-authentication Approach Using User Credential |
| 2.1 | Authentication Key and Authentication Credential |
| 2.2 | Format of Encrypted Data |
| 2.3 | Mechanisms for Issuing Keys and Credentials |
| 2.4 | Challenge-Response Mechanism |
| 3.0 | Implementation Mechanisms: Hardware Overview |
| 4.0 | Extensions and Alternatives |

1.0 STRUCTURAL & FUNCTIONAL OVERVIEW

According to one embodiment, an initial EAP-SIM authentication is performed, and during or immediately after the initial authentication process, short-term re-authentication data is generated and provided to the device. The re-authentication data includes a temporary authentication key and an optional credential, which are later used to authenticate the device for a specified time. If the credential is not included, then the server maintains a separate mapping that associates information identifying the device to the temporary authentication key. As a result, the efficiency of re-authentication is significantly improved.

Figure 1:
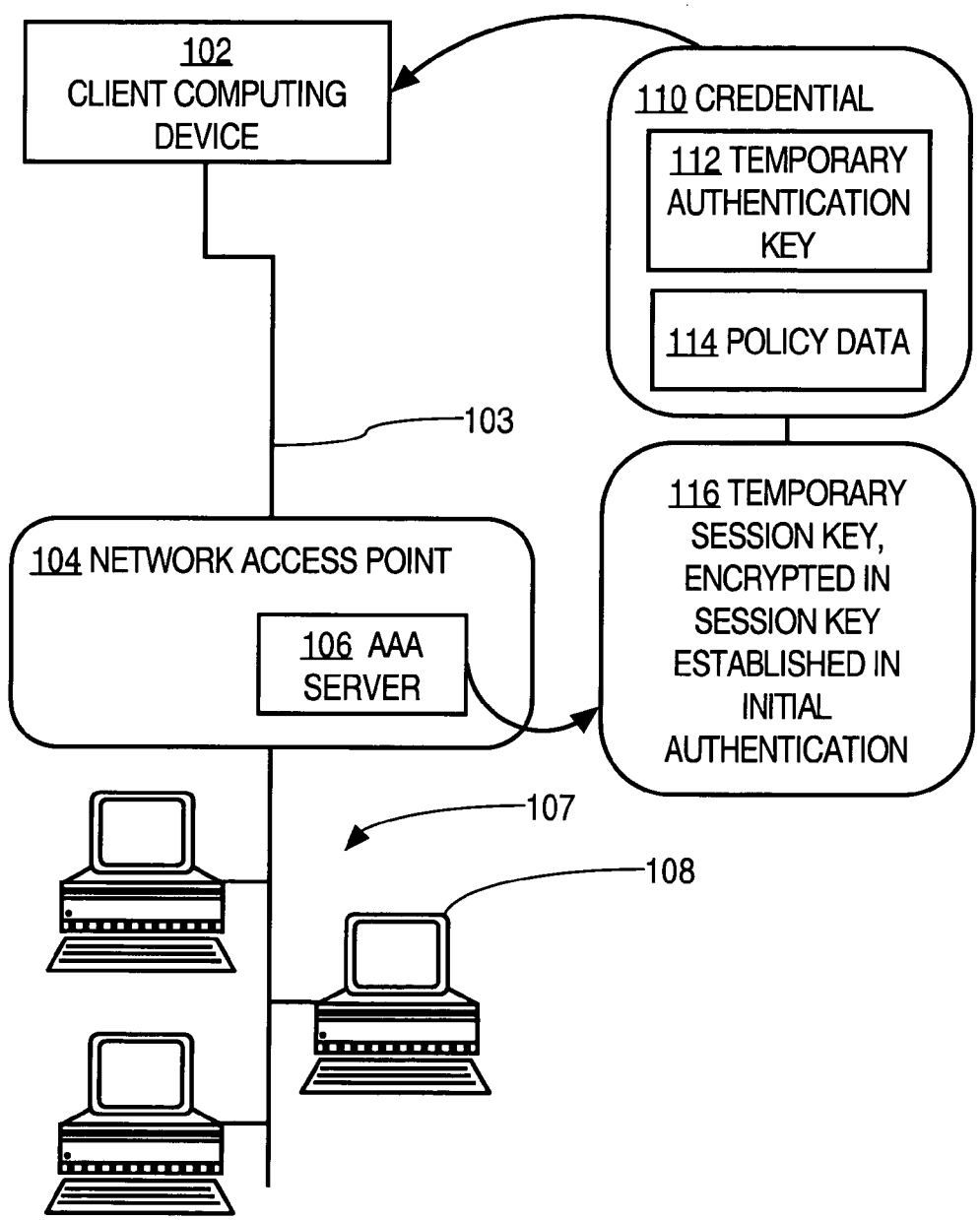
FIG. 1 is a block diagram that illustrates an overview of a network in which an embodiment may be used.

FIG. 1 is a block diagram that illustrates an overview of a wireless network in which an embodiment may be used. A client computing device 102 ("client 102") is communicatively coupled by a link 103 to a network access point 104. In this description, the terms "mobile device," "device," and "client" are used interchangeably to refer to a mobile processing device in the logical position of client 102 and that participates in the re-authentication approach described herein. Such a device may be, for example, a personal digital assistant, personal computer, mobile phone, or any other device that is communicatively coupled to a network using a link. Link 103 may carry communications according to any protocol now known or hereafter developed.

In some embodiments, link 103 is a wireless link, and client 102 communicates wirelessly with other elements of FIG. 1; however, wireless operation is not required by the invention, which is applicable to re-authentication in any kind of network. For example, embodiments may be used for re-authentication between a client and server that are linked by a landline network. Assume, for example, that client 102 has a Web browser and network 107 of FIG. 1 includes a Web server. Assume further that the Web server runs an application that requires re-authentication of the client 102 if the client is inactive or idle for longer than a specified time. The approaches herein may be used to re-authenticate the client when the client resumes activity.

Network access point 104 is a logical entity that provides an initial point of contact for client 102 and that serves to protect a network 107 and its network resources 108 from contact by un-authenticated or unauthorized computing devices. In one embodiment, for example, an Authentication, Access & Accounting (AAA) server 106 ("server 106") performs device authentication functions as described herein to ensure that any client attempting to communicate with network 107 is properly authenticated before such communications begin. In this description, the term "server" refers to a processing element in the network that performs authentication functions, and may be a device other than an AAA server. In one embodiment, server 106 performs the server functions described herein. Functions of the AAA server 106 may be embedded within access point 104 or external to it.

For purposes of illustrating a simple example, FIG. 1 illustrates one client 102, one network access point 106, one network 107, and one credential 110. However, in a practical embodiment, there may be any number of such elements, and embodiments are suitable for use in networks having thousands of clients and numerous network access points.

In an embodiment, as described further below, as part of initially authenticating client 102, server 106 generates and sends a credential 110 to the client for later use in re-authenticating the client. In one specific embodiment, credential 110 comprises a temporary authentication key 112 and policy data 114, as further described below. Credential 110 may also be associated with a temporary session key 116 that is encrypted using a session key that was established in initial authentication. The credential 110 may be encrypted with a key that is known only to server 106.

Figure 2A:
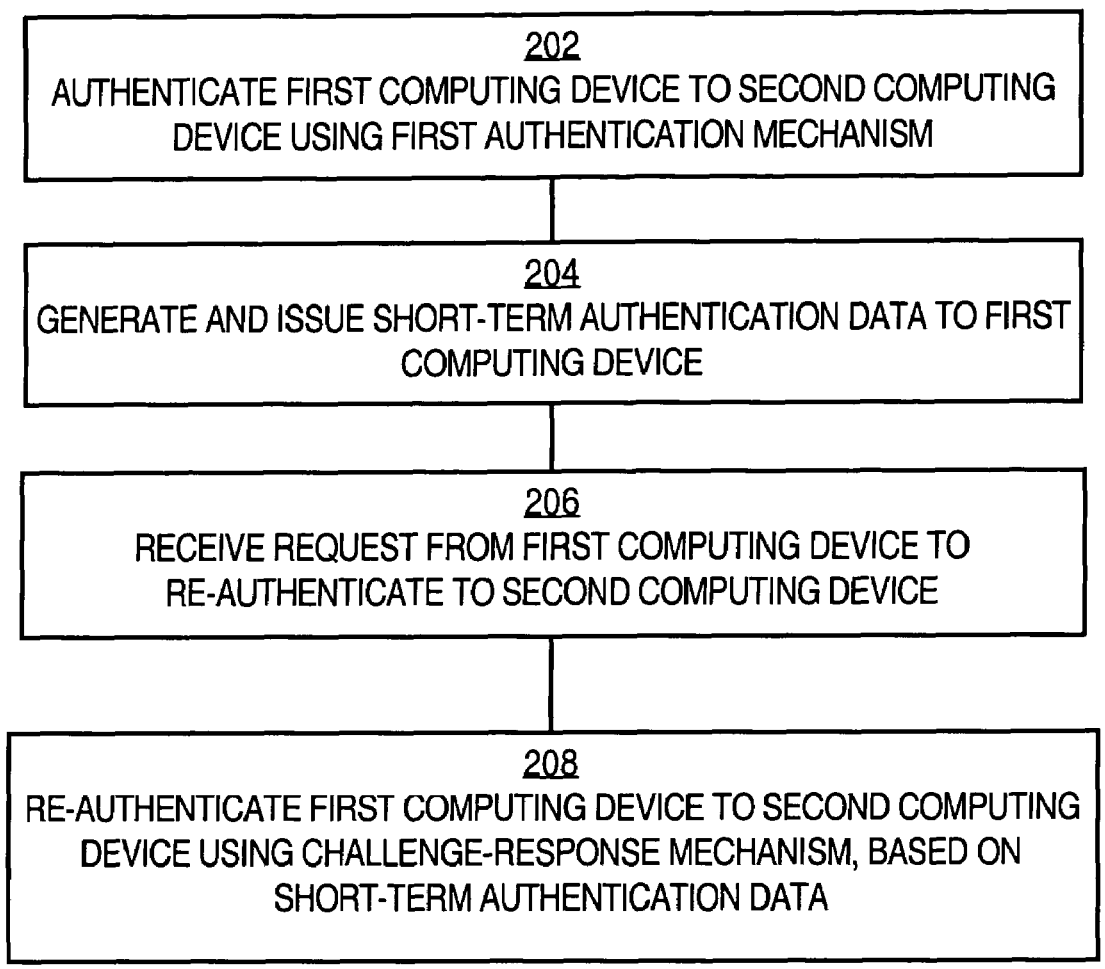
FIG. 2A is a flow diagram that illustrates a high level overview of one embodiment of a method for re-authenticating computing devices.

FIG. 2A is a flow diagram that illustrates a high level overview of one embodiment of a method for re-authenticating computing devices. In block 202, a first computing device is authenticated to a second computing device using a first authentication mechanism. For example, in one embodiment, client 102 is authenticated to server 106 using a conventional authentication mechanism. In embodiments that use 802.11 as a wireless protocol for communication on link 103 and 802.1x for port base access control, the EAP-SIM authentication mechanism may be used.

In block 204, short-term authentication data is generated and issued to the first computing device. For example, a trigger event occurs that requires client 102 to authenticate itself to network access point 104, and in response, credential 110 and temporary session key 116 are generated at server 106 and sent to client 102 as part of an initial authentication process.

In block 206, a request is received from the first computing device to re-authenticate to the second computing device. The request of block 206 occurs in response to a trigger event that requires re-authentication. For example, assume that client 102 is powered up or rebooted, or a user logs off the client, the client is moved to a new access point, the client moves in and out of range of an access point, etc. In response to such a trigger event, access point 104 informs client 102 that the client needs to re-authenticate. In response to such information, client 102 requests authentication.

In block 208, the first computing device is re-authenticated to the second computing device using a challenge-response mechanism that is based on the short-term authentication data. As a result, the first computing device, such as client 102, is re-authenticated in a streamlined manner without requiring numerous round-trip messages to an authentication center to obtain triplets or other authentication data, and without requiring the server to maintain state information.

2.0 RE-AUTHENTICATION APPROACH USING USER CREDENTIAL

Figure 2B:
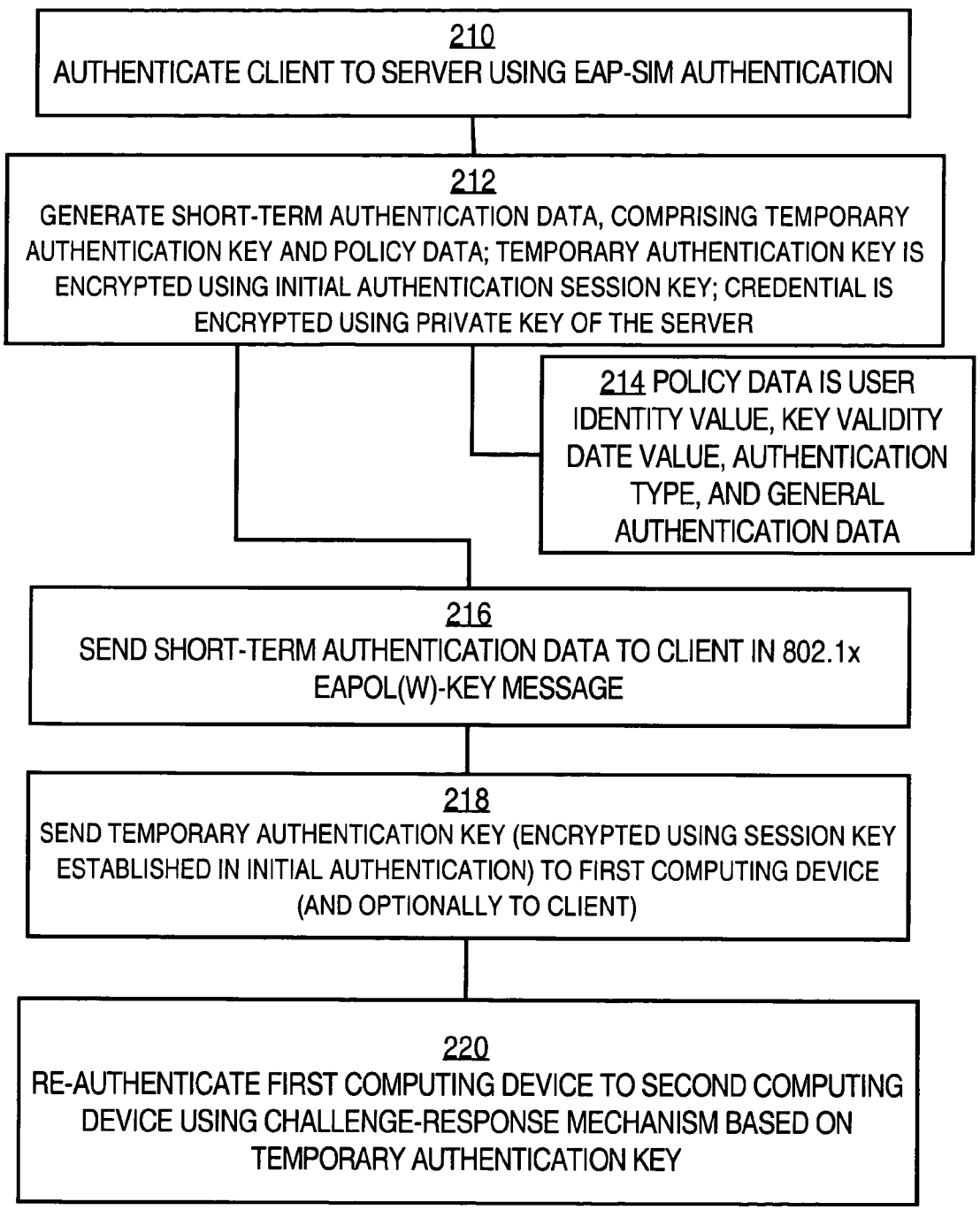
FIG. 2B is a flow diagram that illustrates another embodiment of a method for re-authenticating computing devices.

FIG. 2B is a flow diagram that illustrates another embodiment of a method for re-authenticating computing devices. FIG. 2B is now described with reference to more specific details of a particular embodiment that can be implemented.

In block 210, a client is authenticated to a server using EAP-SIM authentication. For example, client 102 is authenticated to server 106. In block 212, short-term authentication data is generated and issued to the first computing device. Specific attributes of an example embodiment of short-term authentication data are now described.

2.1 Authentication Key and Authentication Credential

In a first approach, the short-term authentication data comprises a temporary authentication key. In a second approach, as in FIG. 1, short-term authentication data comprises a credential 110 that includes a temporary authentication key 112 and policy data 114, packaged together in encrypted format. In either of these approaches, the temporary authentication key comprises a random key that is generated by the server and returned to the client in encrypted form; a derived session key is used to encrypt the temporary authentication key. The optional credential is encrypted in a secret key that is known only to server 106. In embodiments in which the client communicates with a network wirelessly using the 802.1x protocol, the temporary authorization key or credential may be transmitted within the protocol of the EAP-SIM mechanism, or using the 802.1x EAPOL(W)-KEY message, or as a step in another EAP mechanism or a subsequent EAP mechanism designed for this purpose (termed "EAP-FREAKY").

In one specific embodiment, temporary authentication key 112 is a 20-byte random value that is generated so that its value may not be predicted and its value is uniformly distributed over the key space. The temporary authentication key is used only for re-authenticating the client to the server. However, additional keys may be derived from the temporary authentication key for use in authenticating and encrypting data sent between communicating parties.

State information that associates the temporary authentication key with a user identity is either stored at the server, or carried with the message that includes the key. In one embodiment, the server stores the temporary authentication key, and policy data such as a lifetime or expiration value, in a mapping in association with user identity information. This embodiment enables the server to locally store state information that associates a particular temporary authentication with a particular user identity.

Alternatively, a credential is communicated to the client, and when re-authentication is needed, the client provides the credential to the server as proof of identity, in a challenge-response process. In one specific embodiment, the credential contains the following information one or more user identity values (for example, an IMSI value), a date value indicating a date or time during which the key is valid, and the temporary authentication key. In this approach, state information is carried in the credential with the key, and therefore no server resources are needed to store state information.

In another example embodiment, the entire credential is encrypted using a secret key that is known only to the AAA server or to a group of servers that perform AAA functions. For example, an AAA key that is used only by the AAA server and network access devices or network access points that are clients of the AAA server, or shared between several AAA servers, may be used. The credential may be transmitted to the client within the protocol of the EAP-SIM mechanism, or using the 802.1x EAPOL(W)-KEY message, or a subsequent EAP mechanism designed for this purpose (EAP-FREAKY), or as a step in another EAP mechanism.

In one specific embodiment, credential 110 is a data structure containing the temporary authentication key 112 and policy data 114 encrypted in a shared secret or key that is known to the AAA server 106. TABLE 1 below presents one embodiment of a data structure that may be used for the credential. Ellipses indicate values of arbitrary length.

TABLE 1

CREDENTIAL DATA STRUCTURE

| Bit 0-7 | Bit 7-15 | Bit 16-23 | Bit 24-31 |
| --- | --- | --- | --- |
| Key Type | Key type | Key Length | Key Length |
| Key | Key | Key | Key |
| Key | ... | ... | ... |
| ... | ... | ... | ... |
| Attribute Type | Attribute Type | Attribute Len | Attribute Len |
| Attribute | Attribute | Attribute | Attribute |
| Attribute | ... | ... | ... |
| Attribute Type | Attribute Type | Attribute Len | Attribute Len |
| ... | ... | ... | ... |

The key type value specifies a data type that is used for the temporary authentication key. For example, one possible key type value is 20BYTE-RAW(0x0001), which has a length of 20 bytes.

The policy data 114 is structured as a plurality of policy attributes. In one embodiment, the policy attributes comprise an identity name, expiry date/time, authentication type, and authorization data. The identity name attribute (0x0101) is the name of the identity as known to the AAA server 106. The expiry date/time attribute (0x0102) is the time that the credential would expire. The time may be expressed, for example, as a UTC time value as stored on the AAA server. The authentication type attribute (0x0103) identifies an authentication mechanism that is used to authenticate the user. Examples of authentication mechanisms include EAP-SIM, EAP-TLS, EAP-MD5, LEAP, EAP-OTP, EAP-GSS, etc. The authorization data (0x0104) is data specific to the authorization mechanism that is then currently in use; the authorization data is simply passed to the authorization mechanism, and thus is opaque to the authentication processes.

Additional policy attributes may be defined. Policy attributes may be cached on the server 106, or may be included in the credential managed by the client 102.

A structure using these values could have the format shown in TABLE 2, assuming an IMSI identity value of "102030405060708" and an expiry date value of "8:58 PM on Dec. 26, 2001."

TABLE 2

EXAMPLE OF CREDENTIAL DATA STRUCTURE CONTENTS

| Bit 0-7 | Bit 7-15 | Bit 16-23 | Bit 24-31 |
| --- | --- | --- | --- |
| 0x00 | 0x01 | 0x00 | 0x14 |
| 0x22 | 0xf3 | 0x3e | 0x20 |
| 0xce | 0xee | 0xd5 | 0x5d |
| 0x3a | 0xa0 | 0Xe4 | 0x24 |
| 0x33 | 0x5e | 0x67 | 0x82 |
| 0x44 | 0x55 | 0xe3 | 0x41 |
| 0x01 | 0x01 | 0x00 | 0x0f |
| '1' | '0' | '2' | '0' |
| '3' | '0' | '4' | '0' |
| '5' | '0' | '6' | '0' |
| '7' | '0' | '8' | 0x01 |
| 0x2 | 0x0 | 0x0c | '2' |
| '0' | '0' | '1' | '1' |
| '2' | '2' | '6' | '2' |
| '0' | '5' | '8' | 0x01 |
| 0x03 | 0x0 | 0x07 | 'E' |
| 'A' | 'P' | '-' | 'S' |
| 'I' | 'M' | | |

2.2 Format of Encrypted Data

An example format of an encrypted credential is shown in Table 3.

TABLE 3

FORMAT OF ENCRYPTED CREDENTIAL

| Bit 0-7 | Bit 7-15 | Bit 16-23 | Bit 24-31 |
| --- | --- | --- | --- |
| Encryption type | Key version number | Key version number | Key version number |
| Cipher text | Cipher text | Cipher text | Cipher text |
| Cipher text | Cipher text | Cipher text | ... |
| MAC | MAC | MAC | | where "MAC" refers to message authentication code, and the ellipses indicate that the cipher text value and MAC value may be arbitrarily long.

The key version number value is used to determine which key was used to encrypt the credential. Use of a key version number value enables providing scheduled key changes. The encryption type value specifies a type of encryption that was used to encrypt the credential. For example, an encryption type value may specify the AES (Rijndael) encryption algorithm with a 128-bit key, in cipher block chaining (CBC) mode, using the SHA-1 secure hash algorithm to generate a hashed message authentication code (HMAC) with a 160-bit key.

In this example, to provide appropriate security, the keys that are used for AES and HMAC should be different, but they may be derived from the same source. The block size for AES may be 128-bits. A 128-bit random confounder prefix may be added to the data and may be padded to 128-bit block size with random data. The cipher may be initialized with an initialization vector ("IV") of "0". In order to protect the integrity of the data, the HMAC-SHA-1 algorithm is used to compute a keyed hash of the data.

Thus, the data to be encrypted may have the format shown in TABLE 4 below.

TABLE 4

DATA TO BE ENCRYPTED

| Confounder | Confounder | Confounder | Confounder |
| --- | --- | --- | --- |
| Confounder | Confounder | Confounder | Confounder |
| Confounder | Confounder | Confounder | Confounder |
| Confounder | Confounder | Confounder | Confounder |
| Data | Data | Data | Data |
| Data | Data | Data | Data |

TABLE 4-continued

DATA TO BE ENCRYPTED

| Data | Data | Data | Data |
|------|------|------|------|
| Data | Data | Data | Data |
| Data | Data | Data | Data |
| Data | Data | Data | Data |
| Data | Data | Data | Data |
| Data | Data | Data | Data |
| Data | Data | Data | Data |
| Data | Data | Data | Data |
| Data | Data | Data | Data |
| Data | Data | Data | Data |
| Data | Data | Data | Data |
| Data | Data | Data | Data |
| Data | Data | Data | Data |
| Data | Data | Data | Data |
| Data | Data | Pad  | Pad  |
| Pad  | Pad  | Pad  | Pad  |
| Pad  | Pad  | Pad  | Pad  |

Further, the final data would have the format shown in TABLE 5:

TABLE 5

FORMAT OF ENCRYPTED DATA

| 0x01 | 0x00 | 0x00 | 0x00 |
|------|------|------|------|
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| Encdata | Encdata | Encdata | Encdata |
| MAC | MAC | MAC | MAC |
| MAC | MAC | MAC | MAC |

For subsequent authentications, as indicated by block 220, the client and server exchange a series of challenges and responses to authenticate each other based on the temporary authentication key, which functions as a form of shared secret. Thus, in such subsequent authentications, the client returns the encrypted credential to the server, which uses it to verify the challenges and responses sent between the client and server. This alternative reduces the amount of state stored on the server and allows for easier load balancing and fail over of servers.

2.3 Mechanisms for Issuing Keys and Credentials

The server 106 issues credential 110 to client 102 because of successful initial authentication, as in block 210 of FIG. 2B. A shared secret obtained by the server 106 and client 102 during EAP authentication in block 210 is used to encrypt and decrypt the key during transit, as indicated in block 212. The temporary authentication key is encrypted using a session key agreed upon during initial authentication; the credential is encrypted using a key that is private to the server 106.

Referring now to block 214 of FIG. 2B, the short-term authentication data is sent to the client in an 802.1x EAPOL (W)KEY message. In this alternative, 802.1x functionality is extended to exchange a key and credential. For example, a special key descriptor can be defined to contain both the key and the credential in an EAPOL(W)-KEY message.

Alternatively, the EAP mechanism may be extended to support sending the temporary authentication key and credential during EAP exchanges. In this alternative, the session key established during the negotiation can be used to encrypt the key; however, none of the approaches described herein are usable if a session key is not established by the EAP mechanism. Extending the EAP mechanism may involve creating two new optional attributes that hold the key and credential, respectively. For example, optional attributes AT_CISCO_AUTHKEY and AT_CISCO_AUTH-CRED may be created to hold the key and credential respectively. The key is then encrypted using the encryption mechanisms specified for IMSI privacy. Alternatively, a new EAP mechanism is created to deliver the credentials, and the mechanism is defined in a way that it can be chained on to existing EAP mechanisms that generate session keys (e.g., EAP-SIM, EAP-TLS, LEAP, EAP-SRP, EAP-GSSAPI, PEAP, EAP-AKA, EAP-TTLS).

In block 218, the temporary authentication key is sent to the first computing device. The temporary authentication key is encrypted using the session key that was established in initial authentication. The temporary authentication key may also be included in the optional credential 110, or sent in a separate message from server 106 to client 102.

2.4 Challenge-Response Mechanism

Figure 3:
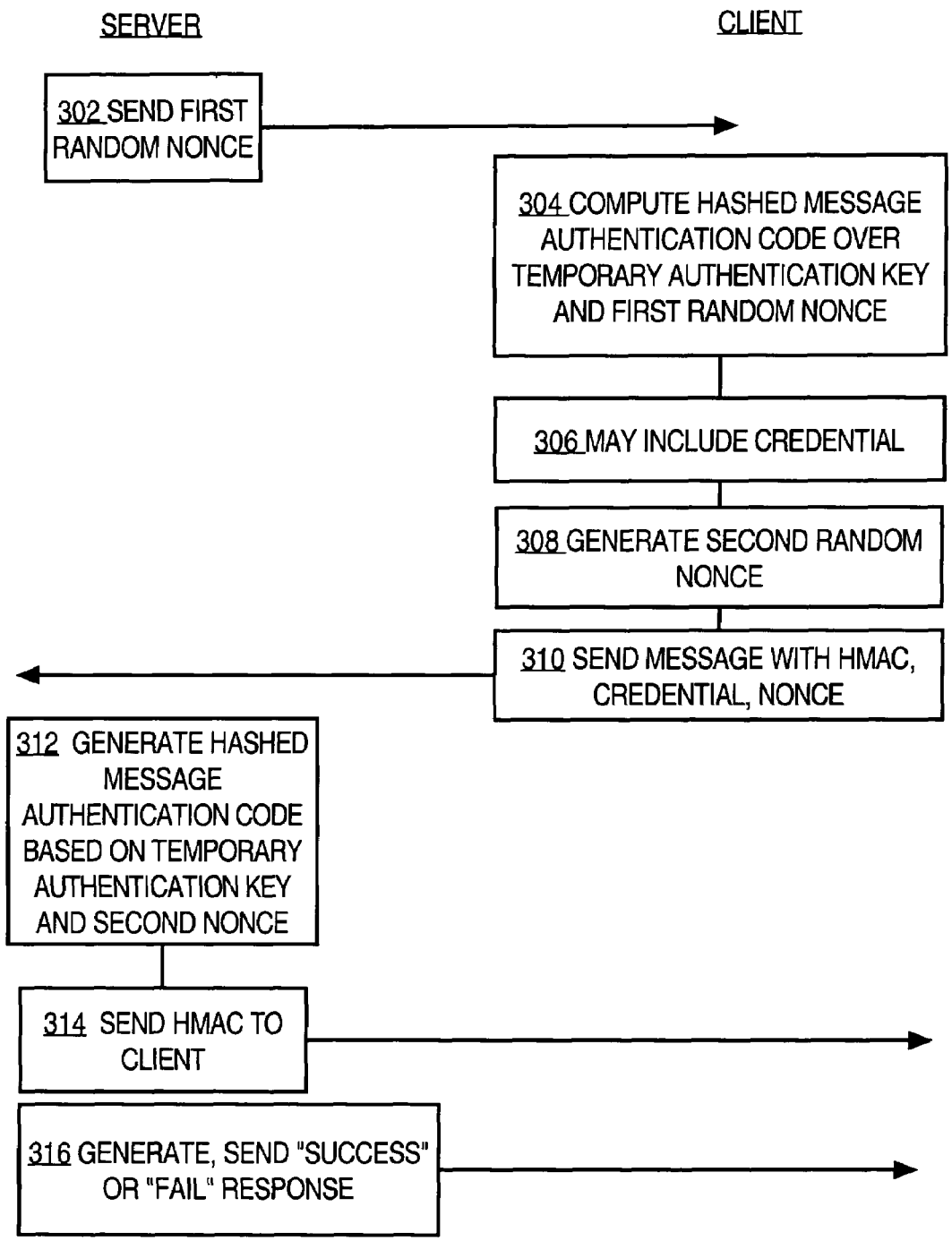
FIG. 3 is a flow diagram that illustrates an embodiment of a challenge-response method for re-authenticating computing devices.

Referring again to FIG. 2B, in block 220, the first computing device is re-authenticated to the second computing device using a challenge-response mechanism based on the temporary authentication key. FIG. 3 is a flow diagram that illustrates an embodiment of a challenge-response method that may be used for re-authenticating computing devices as part of block 220 of FIG. 2B.

In block 302, the server sends a first random nonce value to the client. The nonce may be generated by the home AAA server (e.g., server 106 of FIG. 1), or by a foreign AAA server, or by an access device or enforcement point.

In response, in block 304, the client computes a hashed message authentication code (HMAC) over the temporary authentication key 112 and the first nonce value. The client may also send the entire credential 110, if it has one, as indicated by block 306. The client also generates a second random nonce, in block 308, that the server will use later to generate a MAC. In block 310, a message containing the HMAC, the credential if it is present, and the second nonce value is sent to the server. In shorthand, this operation may be expressed as client→HMAC(Ka, Nonce1), cred (optional), Nonce 2→server The HMAC also may contain other parameters sent in the conversation, such as message headers, version information, or other fields. In block 312, the server generates an HMAC for the second nonce. In block 314, the HMAC is sent to the client. Thus, server→HMAC(Ka, Nonce2)→client This HMAC also may contain other parameters sent in the conversation, such as message headers and other fields. In one alternative embodiment, as part of block 312, the server issues a new session key for uses in mechanisms other than re-authentication, such as Wired Equivalent Privacy ("WEP"), the current encryption standard that is used in IEEE 802.11b wireless networks. The new session key is encrypted using a separate encryption key, which is derived from the temporary authentication key, e.g., using a pseudorandom function. In this alternative, the server message to the client would be server→HMAC(Ka, Nonce2), {conf,Ks}Ke→client wherein the "conf" value is a random confounder value, Ka is the temporary authentication key, Ks is the new session key and Ke is the derived encryption key that is used to encrypt the confounder and Ks. Alternatively, the new session key may be mutually derived rather than encrypted and sent. Typically, during re-authentication a temporary session key is derived from the secrets and the messages that were used in the authentication.

In block 316, the client determines whether it can successfully verify the MAC of the second nonce. If so, then the server generates a success message. If not, the server generates a failure message. Thus, the client responds to the server in the manner that is required under EAP.

Alternatively, the following challenge-response mechanism is used. First, the server generates and sends a first nonce value to the client. Next, the client generates and sends to the server, a second nonce value and a MAC value computed as follows:

C→nonce 2, MAC(Ks, nonce1 nonce2)→S

The server then computes and sends to the client:

S→MAC(Ks, nonce2 nonce 1)→C

This offers an advantage over the earlier alternative approach. If the MAC is calculated over only the challenge from the server, then a rogue server can create a challenge that may provide an advantage in figuring out the secret. This may be especially effective if the secret is a password that is subject to a dictionary search attack. An attacker masquerading as a server could create a dictionary of hashes using a predefined challenge, then send this challenge to the client and see if the client's response matches anything in his dictionary. Since the secret in this case is not password-derived, this is less of a threat. However, by including the client nonce in the hash, the server does not solely choose the nonce and cannot create a dictionary ahead of time, providing better protection against this form of attack.

Using the foregoing mechanisms and processes, a client is efficiently re-authenticated to a server without the time-consuming process of contacting an authentication center, with multiple messages, that is used in prior approaches. Keys and credentials are issued within the 802.1x framework and EAP, to be used for re-authentication and re-keying based on a wide variety of authentication mechanisms. As a result, re-authentication is much simpler than in prior approaches; the client can maintain state information, making the approach more scalable than past approaches; re-authentication is secure, and does not involve the original authentication mechanism; and the approaches are useful in the 802.1x framework and EAP. The approaches described herein can be used with EAP-SIM authentication for wireless LANs, other EAP authentication methods for wireless LANs, such as EAP-TLS, and for authentication in environments that use the 802.1x framework, or in wired LAN environments that use EAP.

3.0 IMPLEMENTATION MECHANISMS

Hardware Overview

Figure 4:
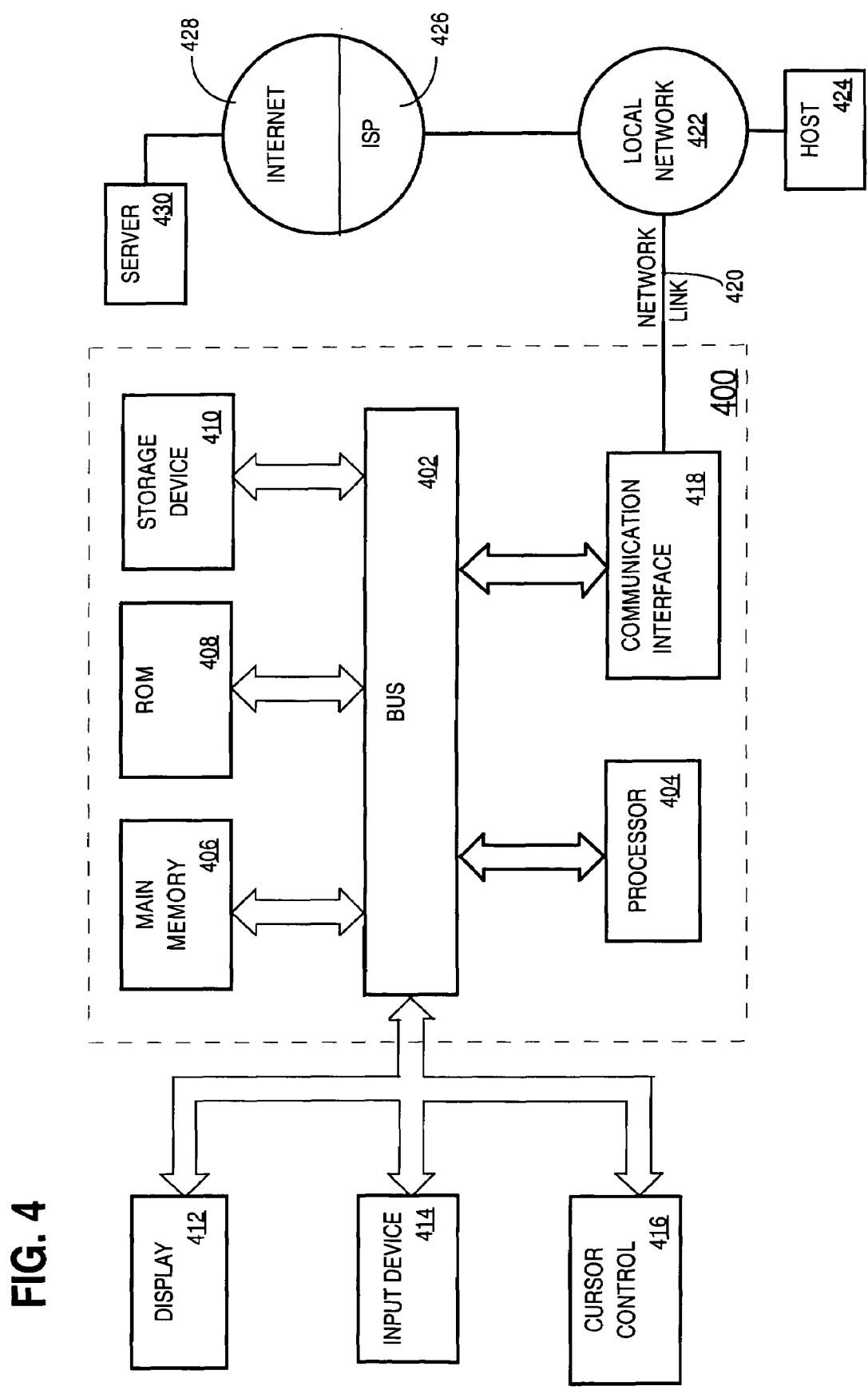
FIG. 4 is a block diagram that illustrates a computer system upon which an embodiment may be implemented.

FIG. 4 is a block diagram that illustrates a general-purpose computer system 400 upon which an embodiment of the invention may be implemented.

Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for re-authenticating computing devices. According to one embodiment of the invention, re-authenticating computing devices is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile storage media, volatile storage media, and transmission media. Non-volatile storage media includes, for example, optical or magnetic disks, such as storage device 410. Volatile storage media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable storage media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for re-authenticating computing devices as described herein.

The received code may be executed by processor 404 as it is received, and/or stored in storage device 410, or other non-volatile storage for later execution. In this manner, computer system 400 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of authenticating a first computing device in communication over a network to a second computing device, the method comprising the computer-implemented steps of:
   authenticating the first computing device to the second computing device using a first authentication mechanism, wherein the first authentication mechanism is based on Extensible Authentication Protocol (EAP) or IEEE 802.1x authentication;
   generating and issuing short-term authentication data to the first computing device, wherein the short-term authentication data comprises a temporary authentication key and a credential that are encrypted using a shared secret;
   receiving a request from the first computing device to re-authenticate to the second computing device;
   re-authenticating the first computing device to the second computing device using a challenge-response mechanism in which the first computing device authenticates itself by presenting the short-term authentication data to the second computing device.

2. A method as recited in claim 1, wherein the first authentication mechanism is one of EAP-SIM, EAP-TLS, LEAP, EAP-AKA, PEAP, EAP-SKE, EAP-MSCHAP-V2, EAP-GSS, EAP-TTLS, or one of EAP-MD5, EAP-OTP, or EAP-SECUREID when used in conjunction with PEAP.

3. A method as recited in claim 1, wherein the short-term authentication data comprises a temporary authentication key and a credential, wherein the temporary authentication key and credential are encrypted using a shared secret known only to the first computing device and second computing device.

4. A method as recited in claim 1, wherein the short-term authentication data comprises a temporary authentication key and a credential, wherein the temporary authentication key is encrypted using a shared secret known only to the first computing device and second computing device and a credential containing the same temporary authentication key is encrypted using a secret known only to the second computing device.

5. A method as recited in claim 1, wherein the short-term authentication data comprises a temporary authentication key and a credential, wherein the temporary authentication key is encrypted using a shared secret known only to the first computing device and second computing device and the credential containing the same temporary authentication key is encrypted using a secret known only to a group of devices that can perform the same function as the second computing device.

6. A method as recited in claim 1, wherein:
   the short-term authentication data comprises a temporary authentication key encapsulated in a credential;
   the credential comprises a user identity value and a key validity date value; and
   the short-term authentication data is encrypted using a shared secret known only to the first computing device and the second computing device.

7. A method as recited in claim 1, wherein:
   the short-term authentication data comprises a temporary authentication key encapsulated in a credential;
   the credential comprises a user identity value, a key validity date value, an authentication type value that identifies a type of authentication process for use in authenticating the first computing device, and authorization data for use in authorizing the first computing device;

the short-term authentication data is encrypted using a shared secret known only to the first computing device and the second computing device;

a second version of the short term authentication data is encrypted with a secret key known only to the second computing device; and sending the second version of the short-term authentication data to the first computing device in the credential.

8. A method as recited in claim 1, wherein:

the short-term authentication data comprises a temporary authentication key and a credential;

the temporary authentication key is encrypted such that only the first computing device and second computing device can decrypt the temporary authentication key;

the first computing device and the second computing device communicate according to EAP or IEEE standard 802.1x; and the temporary authentication key is communicated from the second computing device to the first computing device using a step in another EAP mechanism or using an EAP mechanism designed for such communication.

9. A method as recited in claim 1, further comprising the step of storing, at the second computing device, a mapping of information that associates information identifying the first computing device to the temporary authentication key.

10. A method as recited in claim 1, wherein the step of re-authenticating using a challenge-response mechanism further comprises the step of generating and issuing a session key to the first computing device.

11. A method as recited in claim 1, wherein the step of re-authenticating using a challenge-response mechanism further comprises the steps of:

generating and issuing a session key to the first computing device;

encrypting the temporary authentication key using the session key; and communicating the encrypted temporary authentication key to the first computing device.

12. A method of authenticating a first computing device to a second computing device, wherein the first and second computing devices are in communication over a wireless network using 802.11 and 802.1x protocols, comprising the computer-implemented steps of:

authenticating the first computing device to the second computing device using EAP-SIM authentication;

generating and issuing short-term authentication data to the first computing device, wherein the short-term authentication data comprises a temporary authentication key and one or more policy data values;

sending the short-term authentication data from the second computing device to the first computing device;

receiving a request from the first computing device to re-authenticate to the second computing device;

re-authenticating the first computing device to the second computing device using a challenge-response mechanism in which the first computing device authenticates itself by presenting the short-term authentication data to the second computing device.

13. A method as recited in claim 12, wherein the policy data values comprise a user identity value, a key validity date value, an authentication type value that identifies a type of authentication process for use in authenticating the first computing device, and authorization data for use in authorizing the first computing device.

14. A method as recited in claim 12, further comprising the step of sending a session key to the first computing device for use in communications other than EAP communications.

15. A method as recited in claim 12, wherein:

the short-term authentication data comprises a temporary authentication key encapsulated in a credential;

the credential comprises a user identity value and a key validity date value; and the short-term authentication data is encrypted using a key that only the second computing device can decrypt.

16. A method as recited in claim 12, wherein the temporary authentication key is communicated from the second computing device to the first computing device using a step in another EAP mechanism or using an EAP mechanism designed for such communication.

17. A computer-readable storage medium carrying one or more sequences of instructions for authenticating a first computing device in communication over a network to a second computing device, which instructions, when executed by one or more processors, cause the one or more processors to carry out the steps of:

authenticating the first computing device to the second computing device using a first authentication mechanism, wherein the first authentication mechanism is based on Extensible Authentication Protocol (EAP) or IEEE 802.1x authentication;

generating and issuing short-term authentication data to the first computing device wherein the short-term authentication data comprises a temporary authentication key and a credential that are encrypted using a shared secret;

receiving a request from the first computing device to re-authenticate to the second computing device;

re-authenticating the first computing device to the second computing device using a challenge-response mechanism in which the first computing device authenticates itself by presenting the short-term authentication data to the second computing device.

18. An apparatus for authenticating a first computing device in communication over a network to a second computing device, comprising:

means for authenticating the first computing device to the second computing device using a first authentication mechanism, wherein the first authentication mechanism is based on Extensible Authentication Protocol (EAP) or IEEE 802.1x authentication;

means for generating and issuing short-term authentication data to the first computing device wherein the short-term authentication data comprises a temporary authentication key and a credential that are encrypted using a shared secret;

means for receiving a request from the first computing device to re-authenticate to the second computing device;

means for re-authenticating the first computing device to the second computing device using a challenge-response mechanism in which the first computing device authenticates itself by presenting the short-term authentication data to the second computing device.

19. An apparatus as recited in claim 18, wherein the first authentication mechanism is one of EAP-SIM, EAP-TLS, LEAP, EAP-AKA, PEAP, EAP-SKE, EAP-MSCHAP-V2, EAP-GSS, EAP-TTLS, or one of EAP-MD5, EAP-OTP, or EAP-SECUREID when used in conjunction with PEAP.

20. An apparatus as recited in claim 18, wherein the short-term authentication data comprises a temporary authentication key and a credential, comprising means for encrypting the temporary authentication key and credential using a shared secret known only to the first computing device and second computing device.

21. An apparatus as recited in claim 18, wherein the short-term authentication data comprises a temporary authentication key and a credential, comprising means for encrypting the temporary authentication key using a shared secret known only to the first computing device and second computing device and means for encrypting a credential containing the same temporary authentication key using a secret known only to the second computing device.

22. An apparatus as recited in claim 18, wherein the short-term authentication data comprises a temporary authentication key and a credential, comprising means for encrypting the temporary authentication key using a shared secret known only to the first computing device and second computing device and means for encrypting the credential containing the same temporary authentication key using a secret known only to a group of devices that can perform the same function as the second computing device.

23. An apparatus as recited in claim 18, wherein:
the short-term authentication data comprises a temporary authentication key encapsulated in a credential;
the credential comprises a user identity value and a key validity date value; and
comprising means for encrypting the short-term authentication data using a shared secret known only to the first computing device and the second computing device.

24. An apparatus as recited in claim 18, wherein:
the short-term authentication data comprises a temporary authentication key encapsulated in a credential;
the credential comprises a user identity value, a key validity date value, an authentication type value that identifies a type of authentication process for use in authenticating the first computing device, and authorization data for use in authorizing the first computing device;
comprising means for encrypting the short-term authentication data using a shared secret known only to the first computing device and the second computing device;
comprising means for encrypting a second version of the short term authentication data with a secret key known only to the second computing device; and
comprising means for sending the second version of the short-term authentication data to the first computing device in the credential.

25. An apparatus as recited in claim 18, wherein the short-term authentication data comprises a temporary authentication key and a credential;
comprising means for encrypting the temporary authentication key such that only the first computing device and second computing device can decrypt the temporary authentication key;
comprising means for communicating between the first computing device and the second computing device according to EAP or IEEE standard 802.1x; and
comprising means for communicating the temporary authentication key from the second computing device to the first computing device using a step in another EAP mechanism or using an EAP mechanism designed for such communication.

26. An apparatus as recited in claim 18, further comprising means for storing, at the second computing device, a mapping of information that associates information identifying the first computing device to the temporary authentication key.

27. An apparatus as recited in claim 18, wherein the means for re-authenticating using a challenge-response mechanism further comprises means for generating and issuing a session key to the first computing device.

28. An apparatus as recited in claim 18, wherein means for re-authenticating using a challenge-response mechanism further comprises:
means for generating and issuing a session key to the first computing device;
means for encrypting the temporary authentication key using the session key; and
means for communicating the encrypted temporary authentication key to the first computing device.

29. An apparatus for authenticating a first computing device in communication over a network to a second computing device, comprising:
a network interface that is coupled to the data network for receiving one or more packet flows therefrom;
a processor;
one or more stored sequences of instructions which, when executed by the processor, cause the processor to carry out the steps of:
authenticating the first computing device to the second computing device using a first authentication mechanism, wherein the first authentication mechanism is based on Extensible Authentication Protocol (EAP) or IEEE 802.1x authentication;
generating and issuing short-term authentication data to the first computing device wherein the short-term authentication data comprises a temporary authentication key and a credential that are encrypted using a shared secret;
receiving a request from the first computing device to re-authenticate to the second computing device;
re-authenticating the first computing device to the second computing device using a challenge-response mechanism in which the first computing device authenticates itself by presenting the short-term authentication data to the second computing device.

30. An apparatus as recited in claim 29, wherein the first authentication mechanism is one of EAP-SIM, EAP-TLS, LEAP, EAP-AKA, PEAP, EAP-SKE, EAP-MSCHAP-V2, EAP-GSS, EAP-TTLS, or one of EAP-MD5, EAP-OTP, or EAP-SECUREID when used in conjunction with PEAP.

31. An apparatus as recited in claim 29, wherein the short-term authentication data comprises a temporary authentication key and a credential, comprising instructions for encrypting the temporary authentication key and credential using a shared secret known only to the first computing device and second computing device.

32. An apparatus as recited in claim 29, wherein the short-term authentication data comprises a temporary authentication key and a credential, comprising instructions for encrypting the temporary authentication key using a shared secret known only to the first computing device and second computing device and comprising instructions for encrypting a credential containing the same temporary authentication key using a secret known only to the second computing device.

33. An apparatus as recited in claim 29, wherein the short-term authentication data comprises a temporary authentication key and a credential, comprising instructions for encrypting the temporary authentication key using a shared secret known only to the first computing device and second computing device and comprising instructions for encrypting the credential containing the same temporary authentication key using a secret known only to a group of devices that can perform the same function as the second computing device.

34. An apparatus as recited in claim 29, wherein:

the short-term authentication data comprises a temporary authentication key encapsulated in a credential;

the credential comprises a user identity value and a key validity date value; and comprising instructions for encrypting the short-term authentication data using a shared secret known only to the first computing device and the second computing device.

35. An apparatus as recited in claim 29, wherein:

the short-term authentication data comprises a temporary authentication key encapsulated in a credential;

the credential comprises a user identity value, a key validity date value, an authentication type value that identifies a type of authentication process for use in authenticating the first computing device, and authorization data for use in authorizing the first computing device;

comprising instructions for encrypting the short-term authentication data using a shared secret known only to the first computing device and the second computing device;

comprising instructions for encrypting a second version of the short term authentication data with a secret key known only to the second computing device; and comprising instructions for sending the second version of the short-term authentication data to the first computing device in the credential.

36. An apparatus as recited in claim 29, wherein:

the short-term authentication data comprises a temporary authentication key and a credential;

comprising instructions for encrypting the temporary authentication key such that only the first computing device and second computing device can decrypt the temporary authentication key;

comprising instructions for communicating between the first computing device and the second computing device according to EAP or IEEE standard 802.1x; and comprising instructions for communicating the temporary authentication key from the second computing device to the first computing device using a step in another EAP mechanism or using an EAP mechanism designed for such communication.

37. An apparatus as recited in claim 29, further comprising instructions for encrypting storing, at the second computing device, a mapping of information that associates information identifying the first computing device to the temporary authentication key.

38. An apparatus as recited in claim 29, wherein the instructions for performing re-authenticating using a challenge-response mechanism further comprise instructions for performing generating and issuing a session key to the first computing device.

39. An apparatus as recited in claim 29, wherein the instructions for re-authenticating using a challenge-response mechanism further comprises instructions which, when executed by the one or more processors, cause the one or more processors to perform:

generating and issuing a session key to the first computing device;

encrypting the temporary authentication key using the session key; and communicating the encrypted temporary authentication key to the first computing device.

\* \* \* \* \*